Patented Nov. 28, 1933

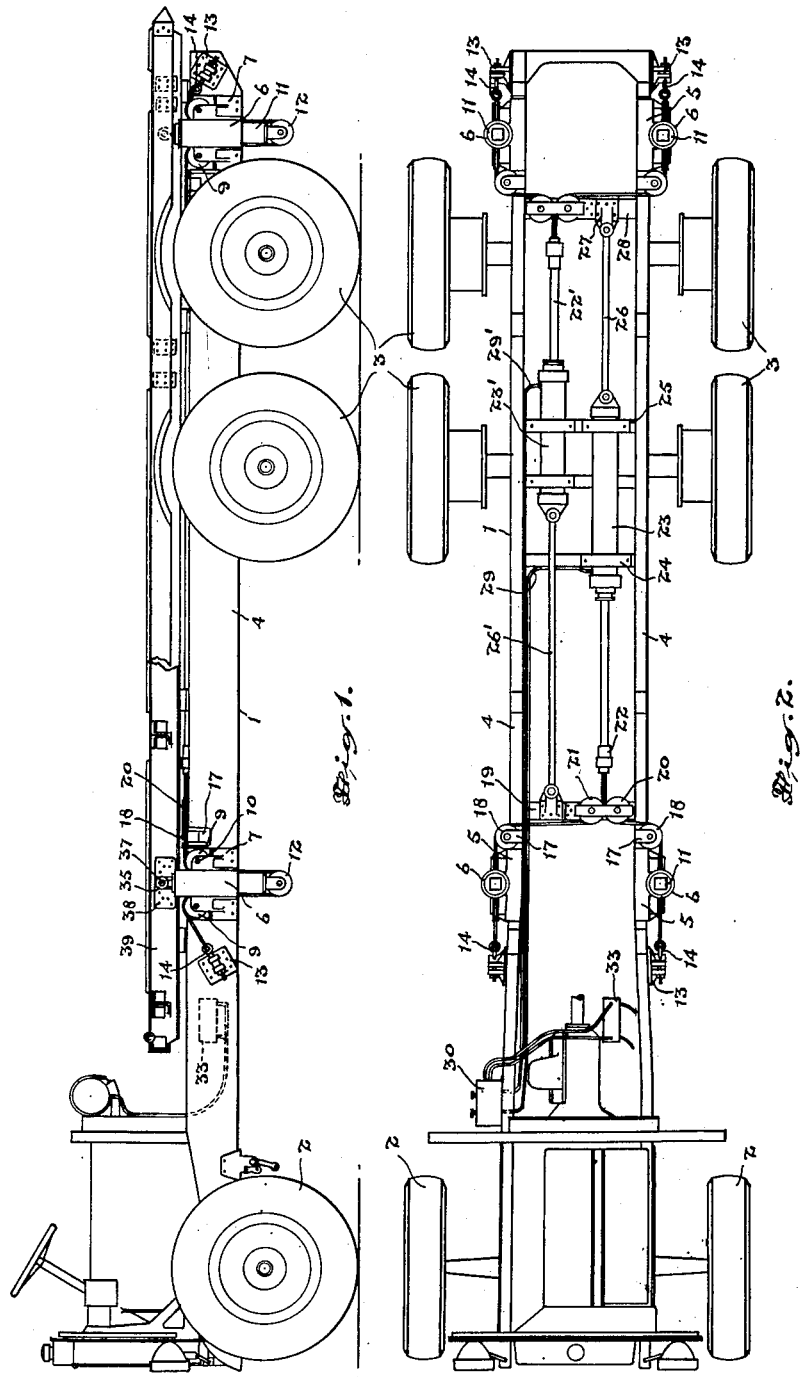

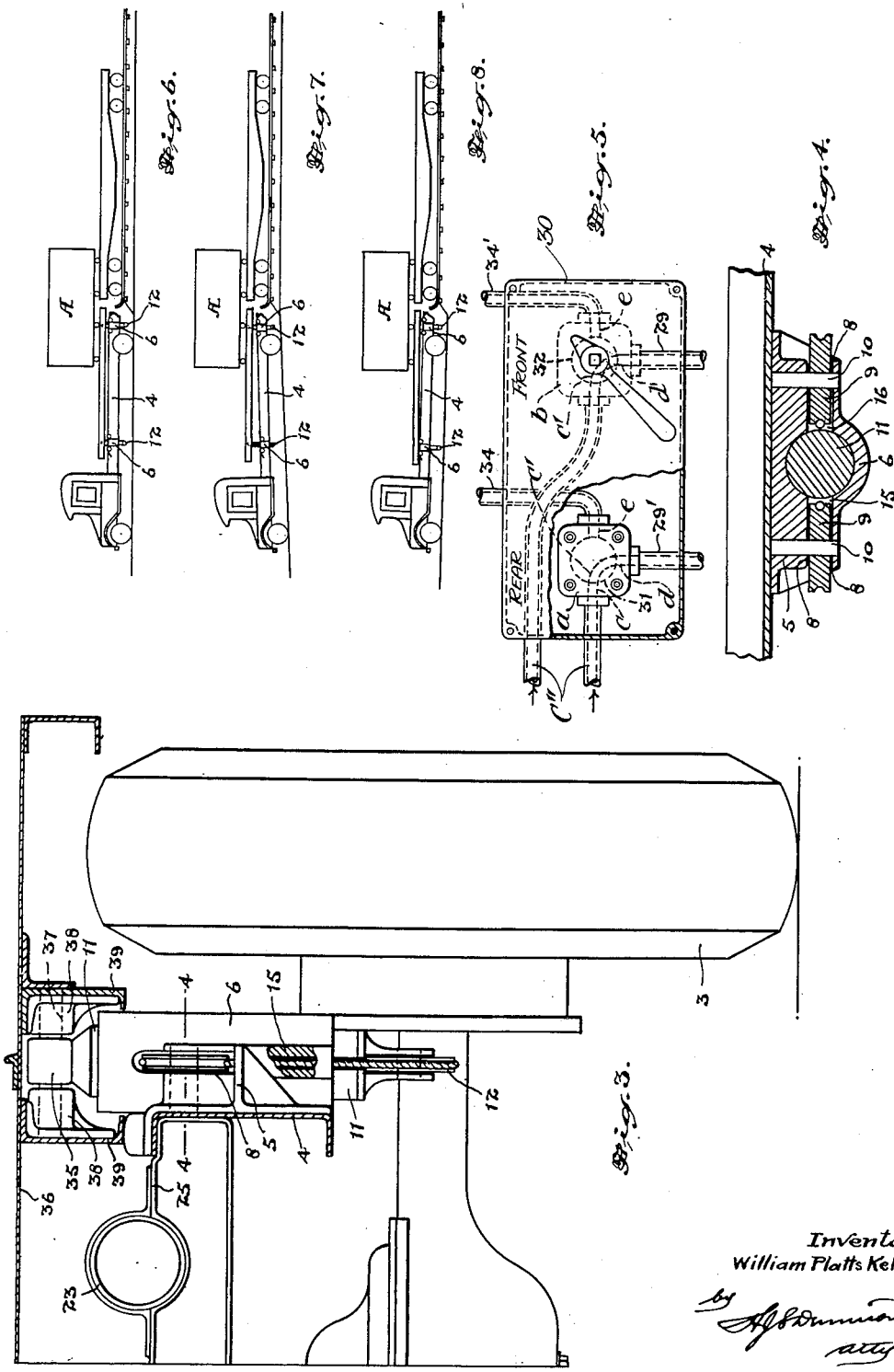

1,937,062

UNITED STATES PATENT OFFICE 1,937,062

TRANSPORT TRUCK

William Platts Kellett, New York, N. Y.

Application July 17, 1933. Serial No. 680,709

8 Claims. (Cl. 254—2)

The principal objects of this invention are, to facilitate the handling of goods in transit between warehouses via truck and railway, and to provide means for handling loaded goods containers with absolute safety to the operator.

A further and important object is to provide a truck with a platform capable of being elevated to various levels which may be operated in both the raising and lowering in a very rapid manner, thereby effecting a considerable saving of time in the loading and unloading of railway cars.

The principal features of the invention consist in the novel construction and arrangement of a moveable platform on a truck and of the guides for directing its movement, whereby cables hydraulically operated are looped to support members connected with the platform and operate in guides on the truck chassis, whereby the platform may be selectively raised or lowered simultaneously at both ends, or selectively at either end to bring it to a desired level to permit of the safe transfer of goods containers to or from a railway car.

On the accompanying drawings, Figure 1 is an elevational and part longitudinal section of a truck equipped with my improved platform elevating apparatus.

Figure 2 is a plan view of the truck with the platform removed.

Figure 3 is an enlarged elevational part sectional detail of a portion of the rear end of a truck showing the platform elevating device.

Figure 4 is a horizontal sectional detail taken on the line 4—4 of Figure 3.

Figure 5 is a diagrammatic plan of the fluid control apparatus for the elevating mechanisms.

Figure 6 is a small diagrammatic elevation showing the relative arrangement of the truck standing on a level road and having its platform elevated level with the railway car.

Figure 7 is a view similar to Figure 6 with the truck arranged on a downward incline, but with its platform level with the railway car.

Figure 8 is a view similar to Figures 6 and 7 showing the truck arranged on an upward incline and having its platform level with the car deck.

In the handling of freight from warehouse to warehouse a great many forms of containers for holding goods and means for transporting the containers have been devised and a very extensive variety of mechanisms have been proposed in the form of what are termed "tilting" or "dumping" trucks and a comparatively few trucks have been devised with their platforms so supported that they may be raised to various levels and tilted by selectively raising or lowering either end thereof to arrange the platform in a desired position in respect to a car mounted on a railway track, irrespective of the grading of the roadway on which the truck is mounted.

The present invention is extremely simple but it is very efficient and is easily and quickly operated.

In the construction herein illustrated the body frame 1 which is supported upon the front and rear wheels 2 and 3 respectively is a substantially rigid frame structure with channel-shaped side sills 4.

On the outer sides of the sills 4 are rigidly mounted the bracket members 5 which are formed with a centrally arranged vertical cylinder portion 6 and laterally flanged portions 7 which are rigidly riveted to the side sills.

The upper ends of the laterally flanged portions are enlarged and provided with vertical slots 8 in which are housed the grooved rollers 9 rotatably mounted on the pins 10 extending transversely of the enlarged flanged portions.

Within each of the cylinders 6 is arranged a vertical plunger 11 which is adapted to move vertically in the cylinder guides. Each plunger is provided with a grooved roller 12 extending from the bottom end thereof and arranged in the same vertical plane as the rollers 9.

A bracket 13 is rigidly mounted on the outer side of each of the sills forward of the cylinders 6. These brackets are set in an angular position and eye bolts 14 are adjustably secured thereto.

A cable is secured to each of the eye bolts and extends upwardly over the forward rollers 9 and passes downwardly on the inner side through a vertical groove 15 in the inner walls of the cylinders 6. The cables are looped around under the rollers on the bottom of the plungers 11 and extend upwardly through the grooves 16 in the inner opposite walls of the cylinders and around the opposite rollers 9.

Secured to the side sills 4 of the frame close to the rear rollers 9 are brackets 17 arranged vertically and carrying horizontally grooved rollers 18 at the top thereof around which the cables pass.

A cross brace 19 extends across the frame 1 immediately adjacent to the brackets 17 and a pair of grooved rollers 20 and 21 are journalled therein and are arranged in the same plane as the side horizontal rollers 18.

The cables extending inwardly from each side of the rollers 18 pass around the rollers 20 and 21 respectively and are secured together at their inner ends to the end of a plunger 22 which is slidably mounted in a hydraulic cylinder 23 rigidly mounted in cross braces 24 and 25.

The extremity of the cylinder 23 opposite to the plunger is secured by a brace 26 to a bracket 27 mounted on a cross bar 28.

It will be understood that upon the application of hydraulic pressure within the cylinder 23, to move the plunger 22 farther into the cylinder, the movement will be transmitted to the cables secured to said plunger and the portions of the cable looped downwardly under the plungers 11 will be drawn upwardly and as the loops are shortened the plungers are raised.

An exactly corresponding construction is arranged at the rear end of the truck, the plungers 11 being raised and lowered by the operation of the plunger 22' in the cylinder 23', which is arranged parallel with the cylinder 23 and connected by the longitudinal brace 26' to the cross brace 19.

The cylinders 23 and 23' are connected by suitable piping 29 and 29' to a valve chest 30 arranged on the forward end of the frame and illustrated diagrammatically in Figure 5.

Such valve chest is here shown as containing a pair of stationary valve bodies $a$ and $b$ related respectively to the cylinders 23 and 23' and each valve body is provided with a triple arrangement of ports $c$ $d$ $e$ which lead to a central valve bore at circumferentially spaced points.

Rotatable valve members 31 and 32 are mounted respectively in the valve bores of the valve bodies $a$ and $b$ and each has a port $c'$ adapted to form a connection between the ports $c$—$d$ when the valve is in one position and between the ports $d$ $e$ when in another position.
The ports $d$ of valves $a$ and $b$ are connected respectively to the cylinders 23 and 23' by means of the pipes 29 and 29'.

A suitable hydraulic pumping device 33 is here shown supplying oil or other suitable fluid under pressure through the conduits $c''$ to the valve ports $c$ so that by turning the valves 31—32 to bring the ports $c'$ into register with the ports $c$ and $d$ the fluid pressure will pass through the pipes 29—29' to the respective cylinders to displace the pistons therein and effect the raising of the truck platform.

The ports $e$ are connected by return pipes 34 and 34' to a suitable reservoir (not shown) so that when it is desired to lower the platform the valves 31—32 are rotated to connect the pipes 29—29' with the return pipes 34—34' so that the fluid in the cylinders is released allowing the platform to lower. It will of course be understood that the valves 31—32 may be separately operated if desired to impart any desired longitudinal tilt to the platform.

In the operation of this device the truck is placed in position in relation to the railway cars so that the goods container A may be rolled from one to the other and if the truck platform is not level with the car platform the truck operator manipulates the valves 31 and 32 so that hydraulic pressure is directed into the cylinders 23 or 23' to pull upon the cables attached to the plunger thereof and the platform is raised, either both ends operating simultaneously, or one end being first raised to a desired position and then the other raised to bring the platform to a level position.
The support of the platform is a suspension support from the cables looped under the vertical plungers and by exerting a pull upon the cables the plungers are raised in their vertical guides.

Each of the plungers is provided with an eye which is pivotally connected to the platform 36, as here shown, by means of a horizontal pin 37 extending between a pair of brackets 38 supported between the paired longitudinal truss bars 39 forming part of the platform and extending longitudinally in alignment with the vertical plungers carried by the frame 1.

It will of course be understood that the plungers 11 must be pivotally connected to the platform. This may be accomplished by many different constructions other than the one described, which is however, of a simple, strong and rugged nature.

A construction such as described is very simple and very dependable. The hydraulic plungers are capable of very heavy duty, as also is the lifting power of steel cables. The vertical plungers operating in the cylinder guides ensures stability and the hinged connection of the plungers to the platform renders the whole structure extremely flexible.

What I claim as my invention is:

1. In a transport truck, the combination with the chassis, of a platform arranged above said chassis, a plurality of plungers pivotally connected to said platform, cables looped to engage and operate said plungers to raise and lower said platform, and hydraulic means for operating said cables.

2. In a transport truck, the combination with the chassis, of a platform arranged above said chassis, vertical guides rigidly mounted on the chassis, plungers slidably mounted in said guides and pivotally connected to said chassis, cables rigidly secured at one end to said chassis and looped under said plungers, and hydraulic means mounted on the chassis for shortening and lengthening said cable loops to raise and lower the platform.

3. A transport truck, comprising a chassis having a rigid frame, brackets rigidly mounted in a vertical position on the sides of said frame and having vertical guideways, grooved rollers mounted at opposite sides of each of said vertical guides on said brackets, plungers slidably arranged in said vertical guideways and each having a grooved roller at the bottom end arranged in the same plane as the aforesaid rollers, a cable secured at one end to the frame and extending around said rollers under said plunger to raise and lower said plunger, means for lengthening and shortening said cable, and a platform pivotally connected to said plungers and adapted to be raised and lowered thereby.

4. A transport truck, comprising a rigid chassis, a plurality of vertical guides rigidly secured to the sides of said chassis, plungers slidably mounted in said vertical guides, a platform pivotally secured to the upper ends of said plungers above said chassis, rollers mounted adjacent to said vertical guides, rollers mounted on said plungers, cables extending over said rollers and looped around the rollers of said plungers, rollers guiding the cables from said looped portions inwardly over the chassis, hydraulic plungers secured to the inward ends of said cables, and hydraulic cylinders embracing said plungers, said plungers being operable in said cylinders to raise and lower the platform.

5. A transport truck, comprising a frame, a pair of hydraulic cylinders mounted horizontally in said frame, plungers operable in said cylinders, a pair of cable lengths connected to each of said plungers, a pair of grooved rollers mounted horizontally in the frame opposite the end of each of said plungers and guiding each pair of cable lengths one of each in opposite transverse directions, horizontal rollers at the outer sides of the frame guiding said cable lengths, vertical rollers at the outer side of the frame guiding said cable lengths vertically, plungers vertically slidable in the frame and engaging the vertically looped portions of said cables, said cables having the ends fixed to the frame, and a platform pivotally connected to the upper ends of said plungers.

6. A transport truck, comprising a chassis frame, a platform mounted above said frame, a plurality of plunger members hinged to said platform, vertical guides mounted on said frame and guiding said plungers, cables each adjustably secured to the frame at one end and looped under said plungers and extending inwardly into the frame, and hydraulically operated plungers mounted in said frame and adapted to operate said cables to manipulate said loops to raise and lower the plungers and the platform carried thereby.

7. In a transport truck, a chassis having a plurality of hydraulic cylinders, plungers operating in said cylinders, cables connected to said plungers and extending outwardly to the outer side of the frame, means for guiding said cables in vertical loops outside said frame, a platform arranged above said chassis, vertically operated members guided in said chassis and engaging said cable loops to be raised and lowered thereby, and control means arranged on the chassis operatively directing a flow of pressure fluid to said hydraulic cylinders and directing the exhaust fluid therefrom.

8. A transport truck, comprising a chassis, a platform arranged above the chassis having paired longitudinal sills, pivoted brackets mounted between said sills plungers pivotally mounted in said brackets and extending downwardly from said platform, guides engaging said plungers and forming vertical supports therewith, pulleys mounted on the lower ends of said plungers, cables looped in said guides and extending into engagement with the pulleys on said plungers, and hydraulic means arranged within the chassis for pulling on said cables to shorten the loops to effect the raising of said plungers and said platform.

WILLIAM PLATTS KELLETT.